United States Patent
Miura et al.

(10) Patent No.: US 9,937,487 B2
(45) Date of Patent: Apr. 10, 2018

(54) EXHAUST GAS CONTROL CATALYST (71) Applicant: TOYOTA JIDOSHA KABUSHIKI KAISHA, Toyota-shi, Aichi-ken (JP)

(72) Inventors: Masahide Miura, Toyota (JP); Isao Chinzei, Toyota (JP); Tetsuhiro Hirao, Toyota (JP); Tadashi Suzuki, Nagakute (JP); Toshitaka Tanabe, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/035,659

(22) PCT Filed: Nov. 6, 2014

(86) PCT No.: PCT/IB2014/002343
§ 371 (c)(1),
(2) Date: May 10, 2016

(87) PCT Pub. No.: WO2015/071716
PCT Pub. Date: May 21, 2015

(65) Prior Publication Data
US 2016/0279620 A1   Sep. 29, 2016

(30) Foreign Application Priority Data

Nov. 14, 2013  (JP) .................. 2013-235829

(51) Int. Cl.
*B01J 23/00*  (2006.01)
*B01J 23/89*  (2006.01)
(Continued)

(52) U.S. Cl.
CPC .......... *B01J 23/894* (2013.01); *B01D 53/945* (2013.01); *B01J 23/464* (2013.01); *B01J 23/63* (2013.01);
(Continued)

(58) Field of Classification Search
CPC ...... B01J 23/894; B01J 35/0073; B01J 23/63; B01J 35/0006; B01J 23/464;
(Continued)

(56) References Cited

U.S. PATENT DOCUMENTS 7,915,195 B2 *  3/2011  Takeshima ........... B01D 53/945
                                                     502/304
2007/0117718 A1  5/2007  Ito et al.
(Continued)

FOREIGN PATENT DOCUMENTS

CN    101479037 A   7/2009
CN    102497927 A   6/2012
(Continued)

*Primary Examiner* — Haytham Soliman
(74) *Attorney, Agent, or Firm* — Sughrue Mion, PLLC (57) ABSTRACT

Provided is an exhaust gas control catalyst including: a substrate (21); and a catalyst layer (22) that is arranged on the substrate, in which the catalyst layer (22) includes a palladium region (23) that contains palladium, aluminum oxide, ceria-zirconia solid solution, and a composite oxide of lanthanum, iron, and zirconium, and a rhodium region (24) that is arranged adjacent to the palladium region along a plane direction of the catalyst layer and contains rhodium, aluminum oxide, and ceria-zirconia solid solution.

4 Claims, 5 Drawing Sheets (51) Int. Cl.
*B01J 23/46* (2006.01)
*B01D 53/94* (2006.01)
*B01J 23/63* (2006.01)
*B01J 35/00* (2006.01)

(52) U.S. Cl.
CPC ....... *B01J 35/0006* (2013.01); *B01J 35/0073* (2013.01); *B01D 2255/1023* (2013.01); *B01D 2255/1025* (2013.01); *B01D 2255/2063* (2013.01); *B01D 2255/2092* (2013.01); *B01D 2255/20715* (2013.01); *B01D 2255/20738* (2013.01); *B01D 2255/407* (2013.01); *B01D 2255/9022* (2013.01); *B01D 2255/9032* (2013.01); *Y02T 10/22* (2013.01)

(58) Field of Classification Search
CPC .......... B01D 53/945; B01D 2255/2092; B01D 2255/20715; B01D 2255/9032; B01D 2255/1025; B01D 2255/20738; B01D 2255/2063; B01D 2255/9022; Y02T 10/22

USPC ....................................................... 502/325
See application file for complete search history.

(56) References Cited

U.S. PATENT DOCUMENTS

| | | |
|---|---|---|
| 2009/0298673 A1 | 12/2009 | Akamine et al. |
| 2009/0325793 A1 | 12/2009 | Takeshima et al. |
| 2012/0283091 A1* | 11/2012 | Sunada ................ B01D 53/945 502/304 |

FOREIGN PATENT DOCUMENTS

| | | |
|---|---|---|
| CN | 102711981 A | 10/2012 |
| JP | 4525909 B2 | 6/2010 |
| JP | 4666006 B2 | 1/2011 |
| JP | 4670603 B2 | 1/2011 |
| JP | 2013-241328 A | 12/2013 |
| WO | 2011/011565 A2 | 1/2011 |

* cited by examiner

FIG. 1

RELATED ART

EXHAUST GAS CONTROL CATALYST

BACKGROUND OF THE INVENTION

1. Field of the Invention

The present invention relates to an exhaust gas control catalyst.

2. Description of Related Art

An exhaust gas control catalyst of an automobile causes hydrocarbon (HC) and carbon oxide (CO) to be oxidized into water and carbon dioxide and causes nitrogen oxide ($NO_x$) to be reduced into nitrogen, in which hydrocarbon (HC), carbon oxide (CO), and nitrogen oxide ($NO_x$) are contained, in exhaust gas exhausted from an engine. As the exhaust gas control catalyst, a noble metal-supported catalyst in which a catalyst layer containing particles of catalytic noble metals such as palladium (Pd), rhodium (Rh), and platinum (Pt) is supported on a heat-resistant metal support is commonly used.

The catalyst layer of the noble metal-supported catalyst contains an OSC material having oxygen storage capacity (hereinafter, also referred as "OSC") as a co-catalyst in addition to the above-described catalytic noble metal particles. The OSC material stores and releases oxygen to promote an exhaust gas control reaction by the catalytic noble metals. As the OSC material, ceria ($CeO_2$)-zirconia ($ZrO_2$) solid solution is widely used, but various OSC materials have been being developed for further performance improvement.

For example, Japanese Patent No. 4670603 describes catalyst particles which have a function of storing and releasing oxygen, the particles including: an iron compound in which an element other than Fe having two valences is solid-soluted in an oxide of Fe having three valences; and a core portion formed from an oxide of Fe having three valences as a main component, in which the iron compound constitutes a layer formed on the outer peripheral surface of the core portion.

Japanese Patent No. 4666006 describes an exhaust gas control catalyst in which a catalyst layer is formed on a support, the catalyst layer including: Ce-containing oxide particles having oxygen storage capacity; and a catalytic metal formed of at least one noble metal selected from the group consisting of Pt, Pd, and Rh. In the catalyst layer, a large amount of iron oxide particles are dispersed and contained, at least a part of the iron oxide particles are fine iron oxide particles having a particle size of 300 nm or less, the fine iron oxide particles are in contact with the Ce-containing oxide particles, an ratio of the area of the fine iron oxide particles to the total area of the iron oxide particles is 30% or higher when observed with an electron microscope.

Japanese Patent No. 4525909 describes a catalyst for a water gas shift reaction which is formed from a composite oxide. This catalyst contains calcium and aluminum as major components and contains iron in an amount of 0.001 mol % to 10 mol % with respect to aluminum. In the catalyst, an oxygen storage capacity at 500° C. is 20 μmol/g to 200 μmol/g, and a BET specific surface area value is 20 $m^2/g$ or higher.

As described above, various materials containing iron oxide have been developed as an OSC material used for an exhaust gas control catalyst. However, when an exhaust gas control catalyst which contains a material containing iron oxide as an OSC material is used over a long period of time, the catalytic activity of a catalytic noble metal may decrease, and/or the oxygen storage capacity of an OSC material may decrease.

SUMMARY OF THE INVENTION

The invention provides an exhaust gas control catalyst capable of substantially inhibiting a decrease in catalytic activity and/or a decrease in the oxygen storage capacity of an OSC material after being used over a long period of time.

The present inventors have found that, in an exhaust gas control catalyst in which iron oxide is used as an OSC material of a catalyst layer, a decrease in the catalytic activity and/or a decrease in the oxygen storage capacity of an OSC material can be substantially inhibited by arranging a region containing the iron oxide and a region containing a catalytic noble metal to be adjacent to each other along a plane direction of the catalyst layer, thereby completing the invention.

According to an aspect of the invention, there is provided an exhaust gas control catalyst including: a substrate; and a first catalyst layer that is arranged on the substrate, in which the first catalyst layer includes a palladium region that contains palladium, aluminum oxide, ceria-zirconia solid solution, and a composite oxide of lanthanum, iron, and zirconium, and a rhodium region that is arranged adjacent to the palladium region along a plane direction of the first catalyst layer and contains rhodium, aluminum oxide, and ceria-zirconia solid solution.

In the exhaust gas control catalyst, a surface area of the palladium region on an uppermost surface of the first catalyst layer may account for 20% to 40% of a total surface area of the first catalyst layer.

The exhaust gas control catalyst may further include one or more second catalyst layers that are arranged between the substrate and the first catalyst layer.

According to the invention, it is possible to provide an exhaust gas control catalyst capable of substantially inhibiting a decrease in catalytic activity and/or a decrease in the oxygen storage capacity of an OSC material after being used over a long period of time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, preferred embodiments of the invention will be described in detail.

In the drawings, the dimension and shape of each portion are illustrated with exaggeration for the sake of clarity and are not exactly the same as the actual dimension and shape thereof. Accordingly, the technical scope of the invention is not limited to the dimension and shape of each portion illustrated in the drawings.

<1. Exhaust Gas Control Catalyst>

An exhaust gas control catalyst according to an embodiment of the invention includes a substrate and a catalyst layer that is arranged on the substrate, in which the catalyst layer includes a palladium region and a rhodium region that is arranged adjacent to the palladium region along a plane direction of the catalyst layer.

The present inventors have found that, in an exhaust gas control catalyst in which a material containing iron oxide is used as an OSC material of a catalyst layer, a decrease in the catalytic activity and/or a decrease in the oxygen storage capacity of an OSC material after being used over a long period of time can be substantially inhibited by arranging a region containing the iron oxide and a region containing a catalytic noble metal in the catalyst layer to be adjacent to each other along a plane direction of the catalyst layer. The reason why the exhaust gas control catalyst has the above-described characteristics can be described as follows. The invention is not limited to the following action and principle.

Figure 1:
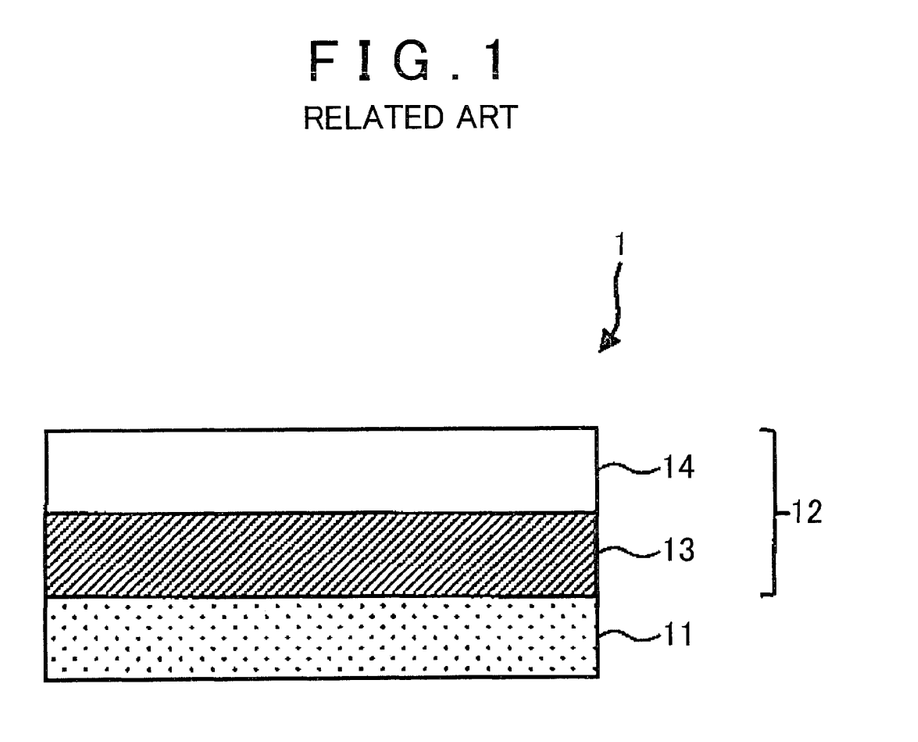
FIG. 1 is a schematic diagram illustrating a configuration of an exhaust gas control catalyst of the related art.

FIG. 1 is a schematic diagram illustrating a configuration of an exhaust gas control catalyst of the related art. As illustrated in FIG. 1, typically, an exhaust gas control catalyst 1 of the related art includes a substrate 11 and a catalyst layer 12 that is arranged on the substrate 11. The catalyst layer 12 includes a first catalyst layer 13 that is arranged on the substrate 11 and a second catalyst layer 14 that is arranged on the first catalyst layer 13 (hereinafter, also referred to as "two-layer catalyst"). Typically, the first catalyst layer 13 contains particles of a catalytic noble metal such as palladium and an OSC material. Typically, the second catalyst layer 14 contains particles of another catalytic noble metal, such as rhodium, having a lower catalytic activity than the catalytic noble metal contained in the first catalyst layer and an OSC material. The above-described configuration is selected to avoid a decrease in catalytic activity caused by a component such as sulfur in exhaust gas. Accordingly, when a material containing iron oxide is used as the OSC material in the first catalyst layer 13, the iron oxide is diffused in the second catalyst layer 14. As a result, the catalytic activity of another catalytic noble metal contained in the second catalyst layer 14 decrease, and/or the oxygen storage capacity of the OSC material may decrease.

Figure 2A:
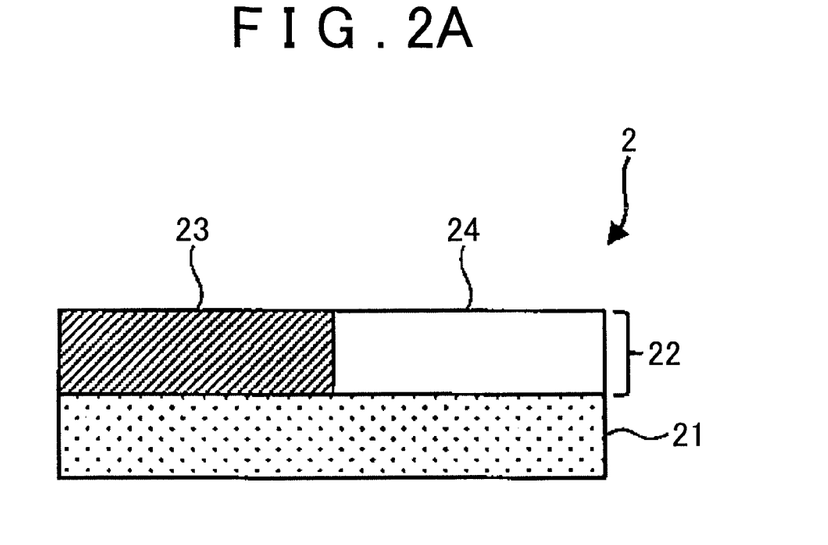
FIG. 2A is a schematic diagram illustrating a configuration of an embodiment of an exhaust gas control catalyst according to the present invention.

FIG. 2A is a schematic diagram illustrating a configuration of the exhaust gas control catalyst according to the embodiment of the present invention. As illustrated in FIG. 2A, an exhaust gas control catalyst 2 includes a substrate 21 and a catalyst layer 22 that is arranged on the substrate 21, in which the catalyst layer 22 includes a palladium region 23 and a rhodium region 24 that is arranged adjacent to the palladium region 23 along a plane direction of the catalyst layer 22 (hereinafter, also referred to as "zone catalyst"). With the above-described configuration of the zone catalyst, the exhaust gas control catalyst according to the embodiment of the invention can substantially inhibit diffusion of iron oxide used as the OSC material of the catalyst layer, as compared to the two-layer catalyst of the related art. Accordingly, with the exhaust gas control catalyst, a decrease in catalytic activity and/or a decrease in the oxygen storage capacity of an OSC material after being used over a long period of time can be substantially inhibited.

In the exhaust gas control catalyst 2, a ratio of the surface area of the palladium region 23 on the uppermost layer surface of the catalyst layer 22 to the total surface area of the catalyst layer 22 is preferably in a range of 10% to 60% and more preferably in a range of 20% to 40%. In the invention, "the surface area on the uppermost layer of the catalyst layer" refers to the surface area of a surface (that is, the uppermost layer) of the catalyst layer that is laminated on the substrate. By controlling the surface area of the palladium region in the exhaust gas control catalyst to be in the above-described range, the diffusion of iron oxide from the palladium region to the rhodium region can be substantially inhibited, and a decrease in catalytic activity and/or a decrease in the oxygen storage capacity of an OSC material after being used over a long period of time can be substantially inhibited.

In the exhaust gas control catalyst according to the embodiment, the palladium region contains palladium, aluminum oxide, ceria-zirconia solid solution, and a composite oxide of lanthanum, iron, and zirconium. In addition the rhodium region contains rhodium, aluminum oxide, and ceria-zirconia solid solution.

In the embodiment of the invention, "ceria-zirconia solid solution" refers to a composite oxide containing ceria ($CeO_2$) and zirconia ($ZrO_2$). The ceria-zirconia solid solution (hereinafter, also referred to as "CZ") and a composite oxide of lanthanum, iron, and zirconium (hereinafter, also referred to as "LFZ") are used as the OSC material of the catalyst layer. The ceria-zirconia solid solution contains preferably 10 mass % to 70 mass % of $CeO_2$ and 30 mass % to 90 mass % of $ZrO_2$ with respect to the total mass of the solid solution. The composite oxide of lanthanum, iron, and zirconium contains preferably 30 mass % to 70 mass % of $La_2O_3$, 10 mass % to 25 mass % of $Fe_2O_3$, and 15 mass % to 40 mass % of $ZrO_2$ with respect to the total mass of the composite oxide. By using the ceria-zirconia solid solution (CZ) having the above-described composition and the composite oxide (LFZ) of lanthanum, iron, and zirconium having the above-described composition, the oxygen storage capacity of the exhaust gas control catalyst can be improved.

Optionally, it is preferable that the ceria-zirconia solid solution (CZ) further contain oxides of one or more transition metals such as yttrium (Y), lanthanum (La), neodymium (Nd), and praseodymium (Pr). It is preferable that each of the oxides of the transition metals be $Y_2O_3$, $La_2O_3$, $Pr_2O_3$, or $Nd_2O_3$. It is preferable that the ceria-zirconia solid solution contain each of the oxides of the transition metals in an amount of 0.5 mass % to 10 mass % with respect to the total mass of the solid solution. By the ceria-zirconia solid solution (CZ) containing the oxides of the transition metals, the oxygen storage capacity of the exhaust gas control catalyst can be further improved.

In the exhaust gas control catalyst according to the embodiment of the invention, optionally, the palladium region and the rhodium region may further contain one or more additional materials. It is preferable that each of the additional materials be, for example, $BaSO_4$ or $La_2O_3$. By the palladium region and the rhodium region containing the additional materials, the oxygen storage capacity of the exhaust gas control catalyst can be further improved.

The composition of each material contained in the palladium region and the rhodium region is not particularly limited and can be determined using a method, for example, a method of dissolving each region of the catalyst layer in an acid or the like and performing inductively coupled plasma (ICP) emission spectroscopy on a metal component in the solution, a method of performing energy-dispersive X-ray (EDX) spectroscopy or electron probe microanalysis (EPMA) on a cross-section or a surface of the catalyst layer, or a method of performing X-ray fluorescence analysis (XRF) on powder of the catalyst layer.

In the exhaust gas control catalyst 2, the form of the substrate 21 is preferably the form of honeycomb, pellet, or particles and more preferably the form of honeycomb. In addition, it is more preferable that the substrate 21 contain a heat-resistant inorganic material such as cordierite or metal. By using such a substrate, the catalytic activity of the exhaust gas control catalyst can be maintained under a high-temperature condition.

Figure 2B:
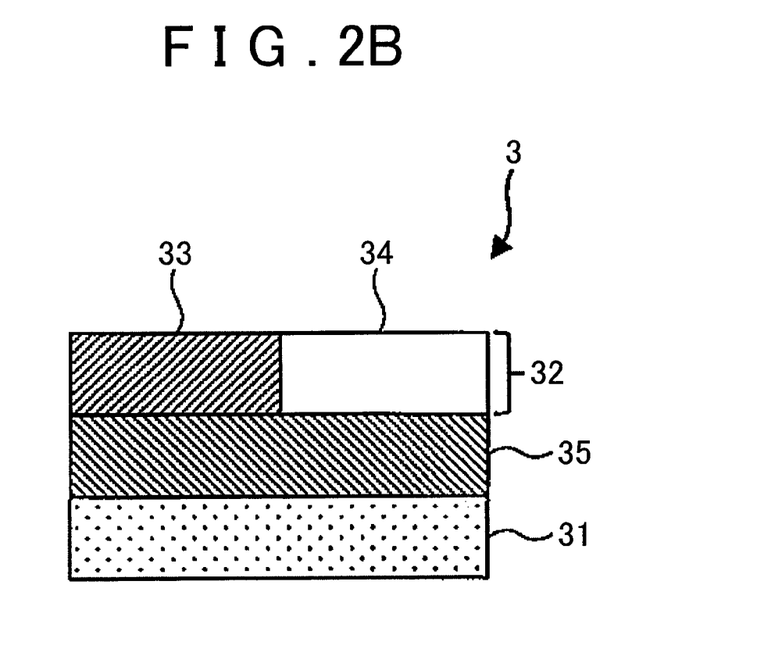
FIG. 2B is a schematic diagram illustrating another embodiment of the exhaust gas control catalyst according to the present invention.

FIG. 2B is a schematic diagram illustrating another embodiment of the exhaust gas control catalyst according to the present invention. As illustrated in FIG. 2B, an exhaust gas control catalyst 3 includes one or more additional catalyst layers 35 that are arranged to be interposed between the substrate 31 and the catalyst layer 32. In the embodiment, the substrate 31, the catalyst layer 32, the palladium region 33, and the rhodium region 34 have the same characteristics as described above, respectively. It is preferable that the additional catalyst layer 35 be formed of the same material as the palladium region 33. By the additional catalyst layer 35 having the above-described configuration, the durability of the exhaust gas control catalyst can be further improved.

The exhaust gas control catalyst according to the embodiment of the invention is not particularly limited, but can be produced using, for example, a method which is commonly used in the related art such as a method of sequentially wash-coating a slurry containing a metal oxide and, optionally, a catalytic noble metal on the substrate.

As described above, with the exhaust gas control catalyst according to the embodiment of the invention, the diffusion of iron oxide which is used as the OSC material of the catalyst layer can be substantially inhibited, and thus a decrease in catalytic activity and/or a decrease in the oxygen storage capacity of the OSC material can be inhibited. Accordingly, by using this exhaust gas control catalyst for purifying exhaust gas of an automobile, exhaust gas control performance can be exhibited after the automobile is driven over a long period of time.

Hereinafter, the invention will be described in more detail using Examples. However, the technical scope of the invention is not limited to these Examples.

<1. Material>

As a material of aluminum oxide, a composite oxide containing 1 mass % of $La_2O_3$ and 99 mass % of $Al_2O_3$ was used (hereinafter, also referred to as "LA material").

As a material of ceria-zirconia solid solution (CZ), a composite oxide containing 30 mass % of $CeO_2$, 60 mass % of $ZrO_2$, 5 mass % of $Y_2O_3$, and 5 mass % of $La_2O_3$ was used (hereinafter, also referred to as "CZYL" material).

As a material of a composite oxide (LFZ) of lanthanum, iron, and zirconium, a $LaFeO_3$—$La_2Zr_2O_7$—$ZrO_2$ composite oxide which was prepared such that an atomic ratio (La:Fe:Zr) of La, Fe, and Zr was 1:2:1 was used (hereinafter, also referred to as "LFZ material"). The used material is not limited to the above-described composition. For example, a material having a composition exemplified in Japanese Patent Application Publication No. 2013-241328 (JP 2013-241328 A) can be used.

As a material of a palladium catalyst, an aqueous palladium nitrate solution (manufactured by Cataler Corporation) having a noble metal content of 8.8 mass % was used (hereinafter, also referred to as "Pd/noble metal material").

As a material of a rhodium catalyst, an aqueous rhodium chloride solution (manufactured by Cataler Corporation) having a noble metal content of 2.8 mass % was used (hereinafter, also referred to as "Rh/noble metal material"). As a material of a substrate, a cordierite honeycomb substrate (manufactured by Denso Corporation) of 875 cc was used.

<2. Preparation of Catalyst>

[Comparative Example 1] Two-Layer Catalyst Including a Palladium Layer (Pd(1.0)/CZ(50)+ $Al_2O_3$(75)) and a Rhodium Layer (Rh(0.2)/CZ(60)+ $Al_2O_3$(40))

A material (Pd/CZ) in which palladium (Pd) was supported on the ceria-zirconia solid solution (CZ) was prepared using an impregnation method in which the CZYL material and the Pd/noble metal material were used. The Pd/CZ material, the LA material, and an aluminum oxide-based binder (AS-200, manufactured by Nissan Chemical Industries Ltd.) were suspended in distilled water under stirring to obtain a slurry. The slurry was adjusted such that the volumes of Pd, the LA material, and the CYZL material were 1 g/L, 75 g/L, and 50 g/L with respect to the total volume of the slurry, respectively. The obtained slurry was caused to flow into the substrate. The unnecessary slurry was blown out by a blower. Through the above-described operation, the materials were coated on a surface of an inner wall of the substrate. The substrate coated with the slurry was left to stand in a drying machine set at 120° C. for 2 hours to evaporate water of the slurry. Next, the substrate was left to stand in an electric furnace set at 500° C. for 2 hours to fire the substrate and the coating. Through the above-described operation, a palladium layer containing 50 parts by mass of CZ, on which 1 part by mass of Pd was supported, and 75 parts by mass of $Al_2O_3$ was formed on the surface of the inner wall of the substrate.

A material (Rh/CZ) in which rhodium (Rh) was supported on the ceria-zirconia solid solution (CZ) was prepared using an impregnation method in which the CZYL material and the Rh/noble metal material were used. The Rh/CZ material, the LA material, and an aluminum oxide-based binder (AS-200, manufactured by Nissan Chemical Industries Ltd.) were suspended in distilled water under stirring to obtain a slurry. The slurry was adjusted such that the volumes of Rh, the LA material, and the CYZL material were 0.2 g/L, 40 g/L, and 60 g/L with respect to the total volume of the slurry, respectively. The obtained slurry was caused to flow into the substrate. The unnecessary slurry was blown out by a blower. Through the above-described operation, the materials were coated on a surface of an inner wall of the substrate. The substrate coated with the slurry was left to stand in a drying machine set at 120° C. for 2 hours to evaporate water of the slurry. Next, the substrate was left to stand in an electric furnace set at 500° C. for 2 hours to fire the substrate and the coating. Through the above-described operation, a rhodium layer containing 60 parts by mass of CZ, on which 0.2 parts by mass of Rh was supported, and 40 parts by mass of $Al_2O_3$ was formed on a surface of the palladium layer formed on the surface of the inner wall of the substrate.

[Comparative Example 2] Two-Layer Catalyst Including a Palladium Layer (Pd(1.0)/CZ(50)+ $Al_2O_3$(75)+LFZ(30)) and a Rhodium Layer (Rh (0.2)/CZ(60)+$Al_2O_3$(40))

A two-layer catalyst of Comparative Example 2 was prepared in the same procedure as Comparative Example 1, except that 30 g/L of the LFZ material with respect to the total volume of the slurry was added to the slurry for forming the palladium layer in Comparative Example 1.

[Comparative Example 3] Zone-Layer Catalyst Including a Catalyst Layer that Includes a Palladium Region (Pd(1.0)/CZ(50)+$Al_2O_3$(75)) and a Rhodium Region (Rh(0.2)/CZ(60)+$Al_2O_3$(40))

A material (Pd/CZ) in which palladium (Pd) was supported on the ceria-zirconia solid solution (CZ) was prepared using an impregnation method in which the CZYL material and the Pd/noble metal material were used. The Pd/CZ material, the LA material, and an aluminum oxide-based binder (AS-200, manufactured by Nissan Chemical Industries Ltd.) were suspended in distilled water under stirring to obtain a slurry. The slurry was adjusted such that the volumes of Pd, the LA material, and the CYZL material were 1 g/L, 75 g/L, and 50 g/L with respect to the total volume of the slurry, respectively. The obtained slurry was caused to flow into a front stage side of the substrate (50% of the surface width of the substrate). The unnecessary slurry was blown out by a blower. Through the above-described operation, the materials were coated on a surface of an inner wall of the front stage side of the substrate. The substrate coated with the slurry was left to stand in a drying machine set at 120° C. for 2 hours to evaporate water of the slurry. Next, the substrate was left to stand in an electric furnace set at 500° C. for 2 hours to fire the substrate and the coating. Through the above-described operation, a palladium region containing 50 parts by mass of CZ, on which 1 part by mass of Pd was supported, and 75 parts by mass of $Al_2O_3$ was formed on the front stage side of the surface of the inner wall of the substrate, that is, a region which is 50% of the total surface area of the catalyst layer.

A material (Rh/CZ) in which rhodium (Rh) was supported on the ceria-zirconia solid solution (CZ) was prepared using an impregnation method in which the CZYL material and the Rh/noble metal material were used. The Rh/CZ material, the LA material, and an aluminum oxide-based binder (AS-200, manufactured by Nissan Chemical Industries Ltd.) were suspended in distilled water under stirring to obtain a slurry. The slurry was adjusted such that the volumes of Rh, the LA material, and the CYZL material were 0.2 g/L, 40 g/L, and 60 g/L with respect to the total volume of the slurry, respectively. The obtained slurry was caused to flow into a rear stage side of the substrate (50% of the surface width of the substrate). The unnecessary slurry was blown out by a blower. Through the above-described operation, the materials were coated on a surface of an inner wall of the rear stage side of the substrate. The substrate coated with the slurry was left to stand in a drying machine set at 120° C. for 2 hours to evaporate water of the slurry. Next, the substrate was left to stand in an electric furnace set at 500° C. for 2 hours to fire the substrate and the coating. Through the above-described operation, a rhodium region containing 60 parts by mass of CZ, on which 0.2 parts by mass of Rh was supported, and 40 parts by mass of $Al_2O_3$ was formed on the rear stage side of the surface of the inner wall of the substrate, that is, a region which is 50% of the total surface area of the catalyst layer.

[Example 1] Zone-Layer Catalyst Including a Catalyst Layer that Includes a Palladium Region (Pd (1.0)/CZ(50)+$Al_2O_3$(75)+LFZ(30)) and a Rhodium Region (Rh(0.2)/CZ(60)+$Al_2O_3$(40))

A zone catalyst of Example 1 was prepared in the same procedure as Comparative Example 3, except that 30 g/L of the LFZ material with respect to the total volume of the slurry was added to the slurry for forming the palladium region in Comparative Example 3.

[Example 2] Zone-Layer Catalyst Including a Catalyst Layer that Includes a Palladium Region (Pd (1.0)/CZ(50)+$Al_2O_3$(75)+LFZ(30)) and a Rhodium Region (Rh(0.2)/CZ(60)+$Al_2O_3$(40))

A zone catalyst of Example 2 was prepared in the same procedure as Example 1, except that a coating width ratio of the palladium region and the rhodium region was 10:90 in Example 1. Through the above-described operation, a palladium region containing 50 parts by mass of CZ, on which 1 part by mass of Pd was supported, and 75 parts by mass of $Al_2O_3$ was formed on the front stage side of the surface of the inner wall of the substrate, that is, a region which is 10% of the total surface area of the catalyst layer.

[Example 3] Zone-Layer Catalyst Including a Catalyst Layer that Includes a Palladium Region (Pd (1.0)/CZ(50)+$Al_2O_3$(75)+LFZ(30)) and a Rhodium Region (Rh(0.2)/CZ(60)+$Al_2O_3$(40))

A zone catalyst of Example 3 was prepared in the same procedure as Example 1, except that a coating width ratio of the palladium region and the rhodium region was 20:80 in Example 1. Through the above-described operation, a palladium region containing 50 parts by mass of CZ, on which 1 part by mass of Pd was supported, and 75 parts by mass of $Al_2O_3$ was formed on the front stage side of the surface of the inner wall of the substrate, that is, a region which is 20% of the total surface area of the catalyst layer.

[Example 4] Zone-Layer Catalyst Including a Catalyst Layer that Includes a Palladium Region (Pd (1.0)/CZ(50)+$Al_2O_3$(75)+LFZ(30)) and a Rhodium Region (Rh(0.2)/CZ(60)+$Al_2O_3$(40))

A zone catalyst of Example 4 was prepared in the same procedure as Example 1, except that a coating width ratio of the palladium region and the rhodium region was 40:60 in Example 1. Through the above-described operation, a palladium region containing 50 parts by mass of CZ, on which 1 part by mass of Pd was supported, and 0.75 parts by mass of $Al_2O_3$ was formed on the front stage side of the surface of the inner wall of the substrate, that is, a region which is 40% of the total surface area of the catalyst layer.

[Example 5] Zone-Layer Catalyst Including a Catalyst Layer that Includes a Palladium Region (Pd (1.0)/CZ(50)+$Al_2O_3$(75)+LFZ(30)) and a Rhodium Region (Rh(0.2)/CZ(60)+$Al_2O_3$(40))

A zone catalyst of Example 5 was prepared in the same procedure as Example 1, except that a coating width ratio of the palladium region and the rhodium region was 60:40 in Example 1. Through the above-described operation, a palladium region containing 50 parts by mass of CZ, on which 1 part by mass of Pd was supported, and 75 parts by mass of $Al_2O_3$ was formed on the front stage side of the surface of the inner wall of the substrate, that is, a region which is 60% of the total surface area of the catalyst layer.

<3. Evaluation Method of Catalyst>

[OSC Evaluation Method]

Using a gasoline engine (2AZ-FE, manufactured by Toyota Motor Corporation), oxygen storage characteristics of the catalysts of Comparative Examples 1 to 3 and Examples 1 to 5 were evaluated. An air-fuel ratio (A/F) was feedback-controlled aiming at an A/F of 14.1 or 15.1. The excess or deficiency of oxygen was calculated according to the following expression from a difference ($\Delta$A/F) between the theoretical air fuel ratio and an A/F sensor output at the stoichiometric point. The maximum oxygen storage was evaluated as OSC.

$$OSC(g)=0.23\times\Delta A/F\times\text{Fuel Injection Amount}$$

[Durability Treatment]

Using a gasoline engine (1UR-FE, manufactured by Toyota Motor Corporation), an accelerated deterioration treatment was performed on the catalysts of Comparative Examples 1 to 3 and Examples 1 to 5 under conditions of 1000° C. (catalyst bed temperature) and 25 hours. At this time, by adjusting a throttle opening angle and an engine load, the treatment was repeatedly performed in a constant circle: a rich condition, a stoichiometric condition, and a lean condition. As a result, the deterioration of the catalysts was accelerated while changing the composition of exhaust gas.

<4. Evaluation Result of Catalyst>

Regarding each of the catalysts of Comparative Examples 1 to 3 and Example 1, the maximum oxygen storage capacity values of the initial stage and after the durability treatment were evaluated in the above-described procedure. The results are shown in FIG. 3.

Figure 3:
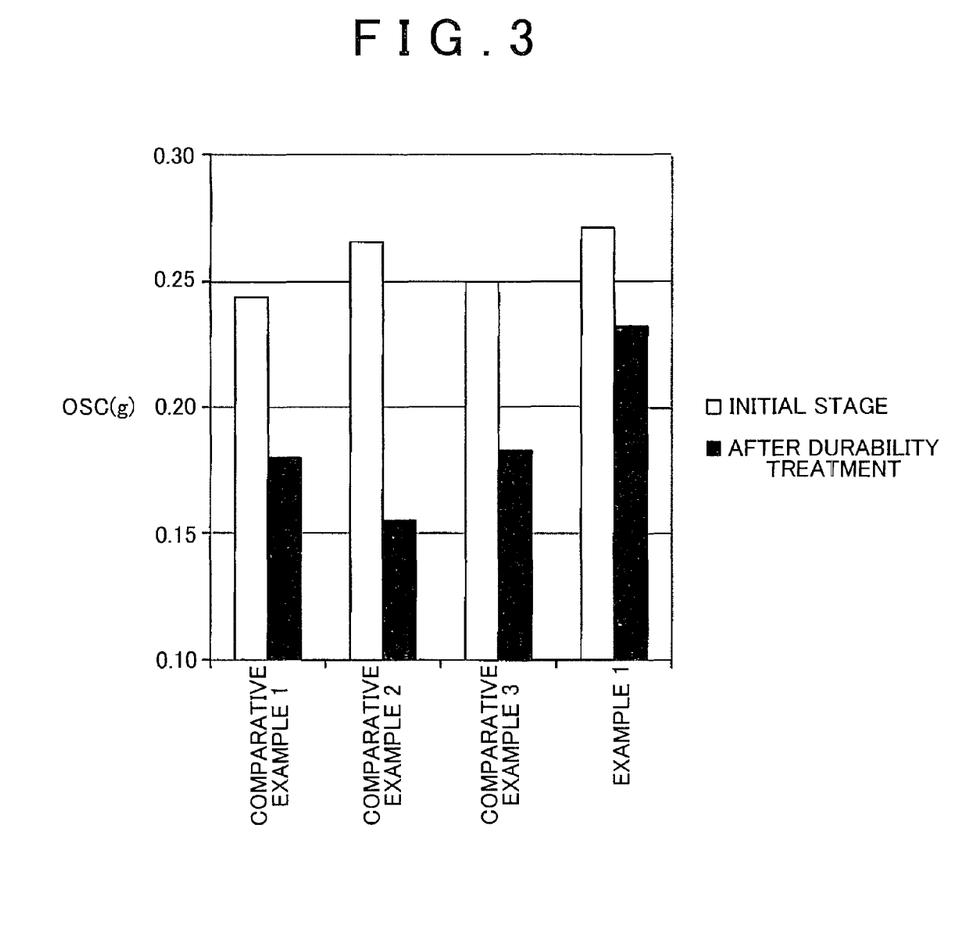
FIG. 3 is a graph illustrating the results of evaluating maximum oxygen storage capacity (OSC) of the initial stage and after a durability treatment regarding each of catalysts of Comparative Examples 1 to 3 and Example 1.
Figure 4:
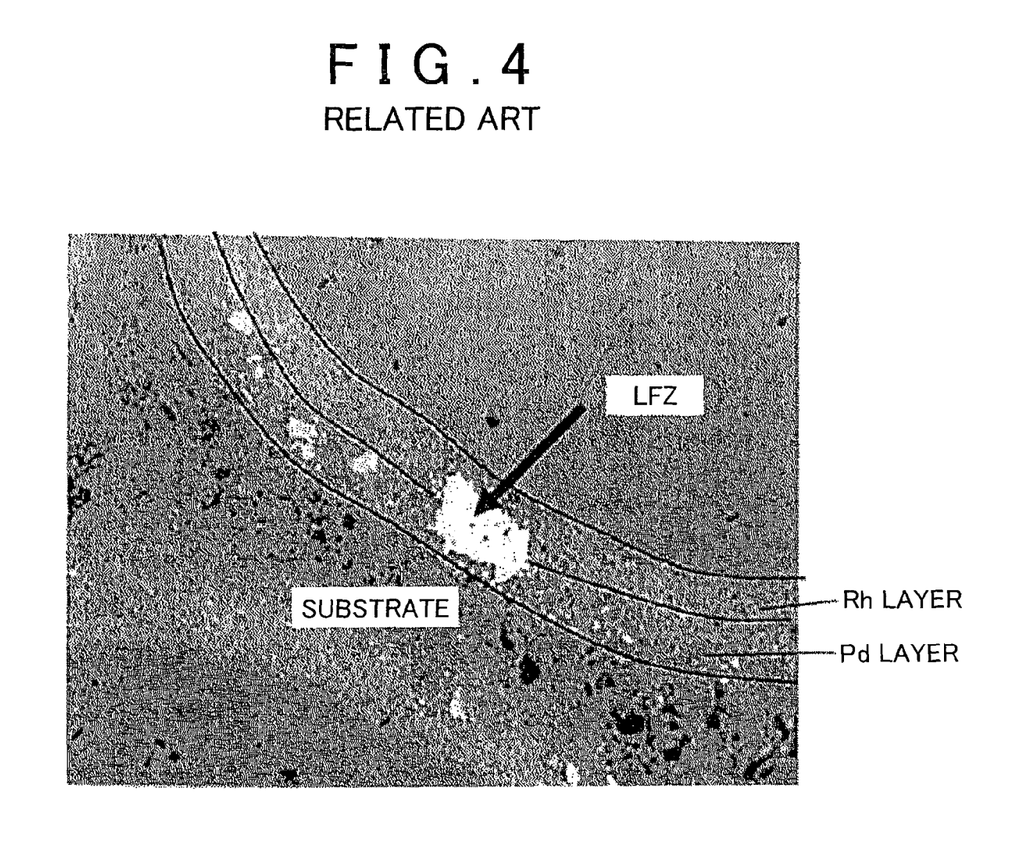
FIG. 4 is a scanning electron microscope image of the catalyst of Comparative Example 2 after a durability test.

As illustrated in FIG. 3, in the catalyst of Comparative Example 2, although the palladium layer contained LFZ, the maximum oxygen storage capacity after the durability treatment decreased significantly as compared to the value of the initial stage. From surface analysis of the catalyst of Comparative Example 2 after the durability treatment using a scanning electron microscope image and electron probe microanalysis (EPMA), it was found that iron in LFZ contained in the palladium layer was diffused to the interface between the palladium layer and the rhodium layer (FIG. 4).

On the other hand, in the catalyst of Example 1 having a structure of the zone catalyst, a decrease in the maximum oxygen storage capacity after the durability treatment was noticeably inhibited as compared to the value of the initial stage.

Regarding each of the catalysts of Examples 1 to 5, the maximum oxygen storage capacity of the initial stage was evaluated in the above-described procedure. The results are shown in FIG. 5.

Figure 5:
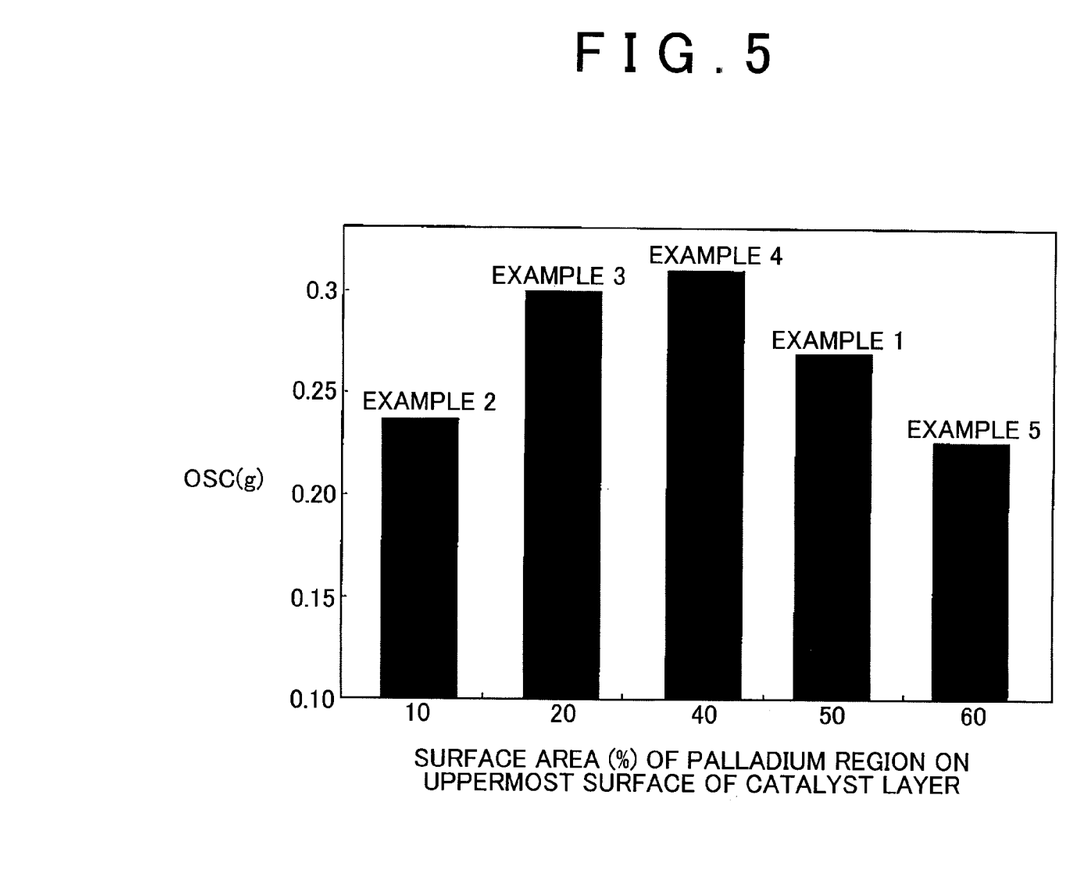
FIG. 5 is a graph illustrating a relationship between the surface area of a palladium region on an uppermost layer of a catalyst layer and maximum oxygen storage capacity (OSC).

As illustrated in FIG. 5, when the surface area of the palladium region to which LFZ was added accounted for 20% to 40% of the total surface area of the catalyst layer, OSC was maximum.

The invention claimed is:

1. An exhaust gas control catalyst comprising:
   a substrate; and
   a first catalyst layer that is arranged on the substrate,
   wherein the first catalyst layer includes:
   a palladium region that contains palladium, aluminum oxide, ceria-zirconia solid solution, and a $LaFeO_3$—$La_2Zr_2O_7$—$ZrO_2$ composite oxide, and
   a rhodium region that is arranged adjacent to the palladium region along a plane direction of the first catalyst layer and contains rhodium, aluminum oxide, and ceria-zirconia solid solution.

2. The exhaust gas control catalyst according to claim 1, wherein a surface area of the palladium region on an uppermost surface of the first catalyst layer accounts for 20% to 40% of a total surface area of the first catalyst layer.

3. The exhaust gas control catalyst according to claim 1, further comprising: one or more second catalyst layers that are arranged between the substrate and the first catalyst layer.

4. The exhaust gas control catalyst according to claim 1, wherein the palladium region and the rhodium region are directly provided on the substrate.

* * * * *